(12) United States Patent
Zhou et al.

(10) Patent No.: US 11,372,101 B2
(45) Date of Patent: Jun. 28, 2022

(54) METHOD AND APPARATUS FOR DETERMINING RELATIVE POSE, DEVICE AND MEDIUM

(71) Applicant: BAIDU ONLINE NETWORK TECHNOLOGY (BEIJING) CO., LTD., Beijing (CN)

(72) Inventors: Xun Zhou, Beijing (CN); Yuanfan Xie, Beijing (CN); Shirui Li, Beijing (CN); Liang Wang, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 294 days.

(21) Appl. No.: 16/562,109

(22) Filed: Sep. 5, 2019

(65) Prior Publication Data

US 2020/0081119 A1 Mar. 12, 2020

(30) Foreign Application Priority Data

Sep. 7, 2018 (CN) .......................... 201811045093.4

(51) Int. Cl.
*G01S 13/931* (2020.01)
*G01S 13/89* (2006.01)
(Continued)

(52) U.S. Cl.
CPC ............ *G01S 13/931* (2013.01); *G01S 13/89* (2013.01); *G01S 13/933* (2020.01); *G05D 1/024* (2013.01); *G05D 1/0257* (2013.01); *G06T 7/70* (2017.01)

(58) Field of Classification Search
None
See application file for complete search history.

(56) References Cited

U.S. PATENT DOCUMENTS

| 9,031,809 B1 * | 5/2015 | Kumar | .................... G06F 3/012 |
| | | | 702/150 |
| 10,024,664 B1 * | 7/2018 | Gill | ........................ G01S 17/933 |

(Continued)

FOREIGN PATENT DOCUMENTS

| CN | 101251592 A | 8/2008 |
| CN | 10206757 A | 6/2012 |

(Continued)

OTHER PUBLICATIONS

Office Action for Japanese application No. 2019-161640, dated Nov. 4, 2020, 4 pages.

(Continued)

*Primary Examiner* — Bernarr E Gregory
(74) *Attorney, Agent, or Firm* — Fay Sharpe LLP (57) ABSTRACT

Embodiments of the present disclosure disclose a method and an apparatus for determining a relative pose, a device, and a medium. The method comprises: obtaining millimeter-wave data for obstacles in a scene collected by a millimeter-wave radar sensor in a vehicle and first data for the obstacles in the scene collected by a first sensor in the vehicle, wherein, at least one millimeter-wave radar signal booster is disposed in the scene as a target obstacle and the obstacles comprise the target obstacle; determining first obstacle data for the target obstacle in a millimeter-wave radar coordinate system and second obstacle data for the target obstacle in a first sensor coordinate system according to the millimeter-wave data and the first data for the obstacles in the scene; and determining the relative pose between the millimeter-wave radar sensor and the first sensor according to the first obstacle data and the second obstacle data.

12 Claims, 4 Drawing Sheets

(51) Int. Cl.
*G01S 13/933* (2020.01)
*G05D 1/02* (2020.01)
*G06T 7/70* (2017.01)
*G01S 13/00* (2006.01)

(56) References Cited

U.S. PATENT DOCUMENTS

| | | | |
|---|---|---|---|
| 10,276,075 B1 * | 4/2019 | Ben-Lavi | G06K 9/3241 |
| 10,478,089 B2 | 11/2019 | Abkai et al. | |
| 10,509,120 B2 * | 12/2019 | Bilik | G01S 13/931 |
| 2006/0164295 A1 | 7/2006 | Focke et al. | |
| 2018/0058882 A1 | 3/2018 | Hodohara et al. | |
| 2018/0231654 A1 | 8/2018 | Bilik et al. | |

FOREIGN PATENT DOCUMENTS

| | | |
|---|---|---|
| CN | 103727930 A | 4/2014 |
| CN | 105509733 A | 4/2016 |
| CN | 108226833 A | 6/2018 |
| CN | 108445456 A | 8/2018 |
| JP | 2001-227982 A | 8/2001 |
| JP | 2004-317507 A1 | 11/2004 |
| JP | 2007-218738 A | 8/2007 |
| JP | 2011-232325 A | 11/2011 |
| JP | 2015127664 A | 7/2015 |
| JP | 2017096813 A | 6/2017 |
| JP | 2017198555 A | 11/2017 |
| WO | 2017/057041 A1 | 4/2017 |
| WO | 2017/130770 A1 | 8/2017 |

OTHER PUBLICATIONS

Translation of Office Action for Japanese application No. 2019-161640, dated Nov. 4, 2020, 4 pages.
Office Action for Chinese Application No. 201811045093.4, dated Mar. 5, 2020, 14 pages.
Partial European Search Report for EP Application No. 19195670.5, dated Apr. 14, 2020, 12 pages.
Extended European Search Report for EP Application No. 19195670.5, dated Jul. 17, 2020, 11 pages.
Office Action for Japanese Application No. 2019-161640, dated Aug. 3, 2021, 3 pages.

* cited by examiner

METHOD AND APPARATUS FOR DETERMINING RELATIVE POSE, DEVICE AND MEDIUM

CROSS REFERENCE TO RELATED APPLICATION

This application claims priority under 35 U.S.C. § 119(a) on Chinese Patent Application No. 201811045093.4, filed with the State Intellectual Property Office of P. R. China on Sep. 7, 2018, the entire contents of which are incorporated herein by reference.

TECHNICAL FIELD

Embodiments of the present disclosure relate to a field of automatic driving, and more particularly to a method and an apparatus for determining a relative pose, a device, and a medium.

BACKGROUND

A millimeter-wave radar sensor and a laser radar sensor are conventional sensors in advanced driving assistant system (ADAS) and a field of automatic driving. The above two sensor are generally installed in a vehicle having the ADAS or an automatic driving function. The millimeter-wave radar sensor refers to a radar sensor operating at a millimeter-wave band. The laser radar sensor is a radar sensor which detects a characteristic amount such as a target position, a velocity or the like by transmitting a laser beam.

SUMMARY

The technical solution in embodiments of the present disclosure provides a method and an apparatus for determining a relative pose, a device, and a medium, to implement determination of a relative pose between a millimeter-wave radar sensor and other sensor.

In a first aspect, embodiments of the present disclosure provide a method for determining a relative pose. The method comprises: obtaining millimeter-wave data for obstacles in a scene collected by a millimeter-wave radar sensor in a vehicle and first data for the obstacles in the scene collected by a first sensor in the vehicle, wherein, at least one millimeter-wave radar signal booster is disposed in the scene as a target obstacle and the obstacles comprise the target obstacle; determining first obstacle data for the target obstacle in a millimeter-wave radar coordinate system and second obstacle data for the target obstacle in a first sensor coordinate system according to the millimeter-wave data and the first data for the obstacles in the scene; and determining the relative pose between the millimeter-wave radar sensor and the first sensor according to the first obstacle data and the second obstacle data.

In a second aspect, embodiments of the present disclosure further provide an apparatus for determining a relative pose. The apparatus comprises: a data obtaining module, a target detection module and a pose determination module.

The data obtaining module is configured to obtain millimeter-wave data for obstacles in a scene collected by a millimeter-wave radar sensor in a vehicle and first data for the obstacles in the scene collected by a first sensor in the vehicle, wherein, at least one millimeter-wave radar signal booster is disposed in the scene as a target obstacle and the obstacles comprise the target obstacle.

The target detection module is configured to determine first obstacle data for the target obstacle in a millimeter-wave radar coordinate system and second obstacle data for the target obstacle in a first sensor coordinate system according to the millimeter-wave data and the first data for the obstacles in the scene.

The pose determination module is configured to determine the relative pose between the millimeter-wave radar sensor and the first sensor according to the first obstacle data and the second obstacle data.

In a third aspect, embodiments of the present disclosure further provide a device. The device includes: one or more processors, a millimeter-wave radar sensor, a first sensor and a storage device. The millimeter-wave radar sensor is configured to collect millimeter-wave data for obstacles in a scene. The first sensor is configured to collect first data for the obstacles in the scene. The storage device is configured to store one or more programs. When the one or more programs are executed by one or more processors, the one or more processors are caused to implement the method for determining a relative pose according to any of embodiments of the present disclosure.

In a fourth aspect, embodiments of the present disclosure further provide a computer readable storage medium having a computer program stored thereon. The program implements the method for determining a relative pose according to any of embodiments of the present disclosure when being executed by a processor.

With embodiments of the present disclosure, first, at least one target obstacle which is detectable by both the millimeter-wave radar sensor and the first sensor is provided; and then the relative pose between the millimeter-wave radar sensor and the first sensor may be determined according to the first obstacle data for the target obstacle in the millimeter-wave radar coordinate system and the second obstacle data for the target obstacle in the first sensor coordinate system. In this way, the determination of the relative pose between the millimeter-wave radar sensor and the first sensor may be implemented. Based on the determined relative pose, detected information from the sensors may be interconverted between the millimeter-wave radar coordinate system and the first sensor coordinate system, thereby utilizing the detected information more sufficiently.

DETAILED DESCRIPTION

Detailed description will be further made below to the present disclosure with reference to the accompanying drawings and the embodiments. It should be understood that, detailed embodiments described herein are intended only to explain the present disclosure, and are not intended to limit the present disclosure. In addition, it should be further noted that, for the convenience of description, only some contents but not all of the structure related to the present disclosure are illustrated in the accompanying drawings.

A millimeter-wave radar coordinate system is different from a laser radar coordinate system. In order to use detection information of the two sensors sufficiently, a conversion of the coordinate system needs to be performed on the detection information. The conversion of the coordinate system needs to determine a correlation between the two coordinate systems, i.e. a relative pose between the two sensors. Therefore, it is necessary for determination of the relative pose between the two sensors.

Embodiment 1

Figure 1:
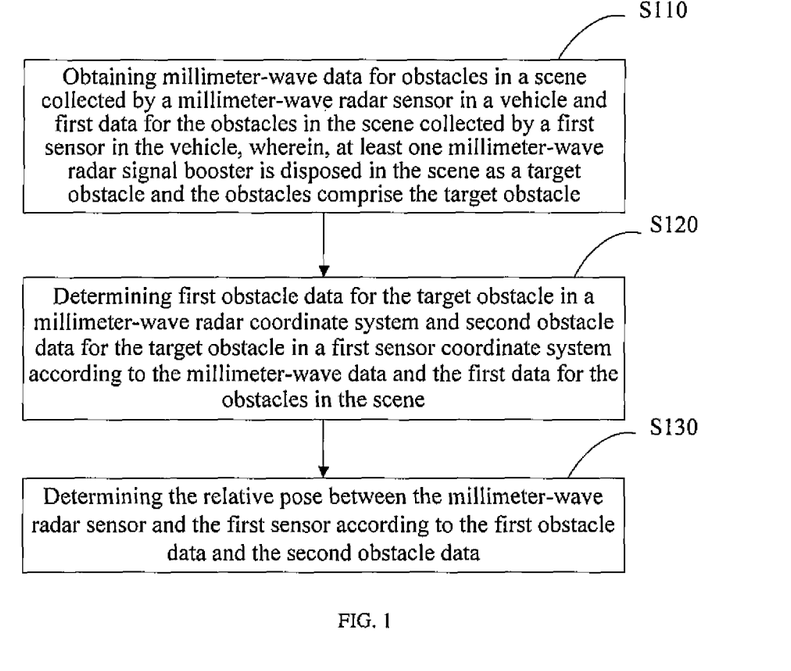
FIG. 1 is a flow chart illustrating a method for determining a relative pose provided in Embodiment 1 of the present disclosure.

FIG. 1 is a flow chart illustrating a method for determining a relative pose provided in Embodiment 1 of the present disclosure. This embodiment may be applicable to a case for calibrating parameters between a millimeter-wave radar sensor and a first sensor which are installed in the same vehicle, i.e. determining a relative pose. The method may be implemented by an apparatus for determining a relative pose. The apparatus may be implemented in software and/or hardware. Referring to FIG. 1, the method for determining a relative pose according to this embodiment comprises the following steps.

At step S110, millimeter-wave data for obstacles in a scene collected by a millimeter-wave radar sensor in a vehicle and first data for the obstacles in the scene collected by a first sensor in the vehicle are obtained, wherein, at least one millimeter-wave radar signal booster is disposed in the scene as a target obstacle and the obstacles comprise the target obstacle.

The first sensor may be any sensor other than the millimeter-wave radar sensor. Typically, the sensor may be a laser radar sensor or a camera sensor.

The millimeter data may be data for the obstacles in the scene that is collected by the millimeter-wave radar sensor.

When the first sensor is the laser radar sensor, the first data may be point-cloud data for the obstacles in the scene that is collected by the laser radar sensor. When the first sensor is the camera sensor, the first data may be image data for the obstacles in the scene that is collected by the camera sensor.

The millimeter-wave radar signal booster may be any component capable of transmitting all of the received electromagnetic waves back, or amplifying the received electromagnetic waves and then reflecting them back. The millimeter-wave radar signal booster may have an extremely strong reflection echo characteristic.

Typically, the millimeter-wave radar signal booster may be a corner reflector. The millimeter-wave radar sensor has great reflection intensity (i.e. sensitivity) with respect to a metal object. Therefore, the millimeter-wave radar signal booster may be set as required, such that a detection result for a target obstacle is distinguished from a detection result for a non-target obstacle.

The number of the millimeter-wave radar signal booster may be at least one. When there are a plurality of the millimeter-wave radar signal boosters, the plurality of millimeter-wave radar signal boosters may be provided differently, such as, in different shapes or different volumes, so as distinguish different millimeter-wave radar signal boosters, and also to facilitate the matching with different millimeter-wave radar signal booster data in the following operations.

When there are a plurality of the millimeter-wave radar signal boosters, in order to distinguish different millimeter-wave radar signal boosters, a set spacing between different millimeter-wave radar signal boosters may be greater than a set distance threshold. The set distance threshold may be determined as required or by experience.

When the first sensor is the camera sensor, a coloring process or a texture-applying process may be performed on the target obstacle, such that the target obstacle may be easily detected from the image collected by the camera sensor.

The target obstacle may be the millimeter-wave radar signal booster provided in the scene, and configured to determine the relative pose between the above two kinds of sensors.

At step S120, first obstacle data for the target obstacle in a millimeter-wave radar coordinate system and second obstacle data for the target obstacle in a first sensor coordinate system are determined according to the millimeter-wave data and the first data for the obstacles in the scene.

Specifically, data corresponding to the target obstacle may be determined based on data characteristics of the target obstacle in the millimeter-wave radar sensor coordinate and in the first sensor coordinate system, i.e., filtering out noise data of non-target obstacles.

Velocities, positions and reflection intensities of respective objects in the scene may be determined according to the millimeter-wave data for the obstacles in the scene. The set target obstacle is static, and the millimeter-wave radar sensor has greater reflection intensity with respect to the target obstacle of metal material than those objects of other materials. Therefore, those objects, of which the velocities are not zero and of which the reflection intensities are lower than an intensity threshold, are filtered out.

At step S130, the relative pose between the millimeter-wave radar sensor and the first sensor is determined according to the first obstacle data and the second obstacle data.

Specifically, determining the relative pose between the millimeter-wave radar sensor and the first sensor according to the first obstacle data and the second obstacle data comprises: determining a position error of the target obstacle according to a relative pose variable between the millimeter-wave radar sensor and the first sensor, and first position data and second position data of the target obstacle; and determining a target function according to the position error of the target obstacle, performing a minimizing process on the target function, and using a relative pose corresponding to a minimized target function as the relative pose between the millimeter-wave radar sensor and the first sensor.

Here, the first position data is position data of the target obstacle in the millimeter-wave radar coordinate system, which may be obtained from the first obstacle data.

An initial value of the relative pose variable is an initial relative pose. The initial relative pose may be set at the factory before shipment.

The second position data is position data of the target obstacle in the first sensor coordinate system, which may be obtained from the second obstacle data.

The position errors of respective obstacles may be determined by converting the first obstacle data and the second obstacle data to be data in the same coordinate system. A detection error for the same target obstacle after the conversion may be determined according to the converted obstacle data.

Alternatively, the first obstacle data may be converted to be data in the first sensor coordinate system, which is compared with the second obstacle data for determining the error. Alternatively, the second obstacle data may be converted to be data in the millimeter-wave radar coordinate system, which is compared with the first obstacle data for determining the error.

For example, when the first sensor is the camera sensor, the first obstacle data may be converted to be data in the camera sensor coordinate system, which is compared with the second obstacle data for determining the error. Alternatively, the second obstacle data may be converted to be data in the millimeter-wave radar coordinate system, which is compared with the first obstacle data for determining the error.

With the technical solution in embodiments of the present disclosure, first, at least one target obstacle which is detectable by both the millimeter-wave radar sensor and the first sensor is provided; and then the relative pose between the millimeter-wave radar sensor and the first sensor may be determined according to the first obstacle data for the target obstacle in the millimeter-wave radar coordinate system and the second obstacle data for the target obstacle in the first sensor coordinate system. In this way, the determination of the relative pose between the millimeter-wave radar sensor and the first sensor may be implemented. Based on the determined relative pose, detected information from the sensors may be interconverted between the millimeter-wave radar coordinate system and the first sensor coordinate system, thereby utilizing the detected information more sufficiently.

Further, before determining the position error of the target obstacle according to the relative pose variable between the millimeter-wave radar sensor and the first sensor, and the first position data and the second position data of the target obstacle, the method further comprises: recognizing a first target obstacle included in the scene according to the millimeter-wave data for the obstacles in the scene; recognizing a second target obstacle included in the scene according to the first data for the obstacles in the scene; and determining a corresponding relationship between the first target obstacle included in the scene and the second target obstacle included in the scene.

Here, the first target obstacle is a target obstacle detected based on the millimeter-wave data from the millimeter-wave radar sensor. The second target obstacle is a target obstacle detected based on the first data from the first sensor.

When the first sensor is the camera sensor, a method for recognizing the target obstacle in the scene according to the image data of the obstacles in the scene may be any algorithm capable of recognizing the target obstacles. Typically, the algorithm may be various algorithms such as a template matching algorithm, a deep-learning algorithm or a conventional target detection algorithm.

Further, recognizing the first target obstacle included in the scene according to the millimeter-wave data for the obstacles in the scene comprises: determining velocities and positions of respective objects in the scene according to the millimeter-wave data for the obstacles in the scene, and filtering out objects of which the velocities are not zero; determining reflection intensities of respective objects in the scene according to the millimeter-wave data for the obstacles in the scene, and filtering out objects of which the reflection intensities are lower than an intensity threshold; and determining whether the remaining objects are target obstacles according to actual relative distances between different target obstacles and positions of the remaining objects, so as to obtain respective target obstacles included in the obstacle data.

Embodiment 2

Figure 2:
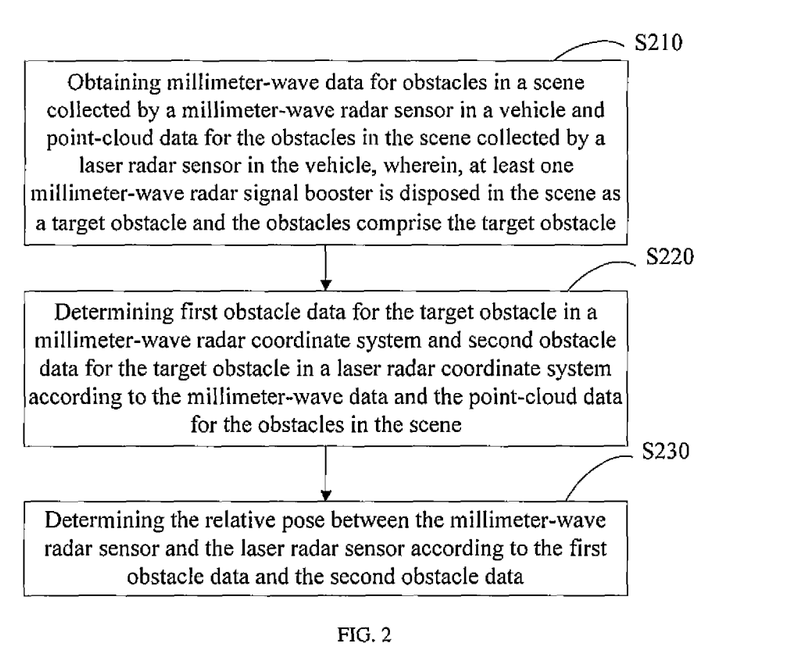
FIG. 2 is a flow chart illustrating a method for determining a relative pose provided in Embodiment 2 of the present disclosure.

FIG. 2 is a flow chart illustrating a method for determining a relative pose provided in Embodiment 2 of the present disclosure. This embodiment is an alternative solution on the basis of the above embodiment by taking the laser radar sensor as an example. Referring to FIG. 2, the method for determining a relative pose according to this embodiment comprises the following steps.

At step S210, millimeter-wave data for obstacles in a scene collected by a millimeter-wave radar sensor in a vehicle and point-cloud data for the obstacles in the scene collected by a laser radar sensor in the vehicle are obtained, wherein, at least one millimeter-wave radar signal booster is disposed in the scene as a target obstacle and the obstacles comprise the target obstacle.

Typically, the millimeter-wave radar signal booster may be a corner reflector. The millimeter-wave radar sensor has great reflection intensity (i.e. sensitivity) with respect to a metal object, and the laser radar sensor also has great reflection intensity (i.e. sensitivity) with respect to a white object. Therefore, the millimeter-wave radar signal booster may be set as required, such that a detection result for the target obstacle is distinguished from a detection result of a non-target obstacle.

At step S220, first obstacle data for the target obstacle in a millimeter-wave radar coordinate system and second obstacle data for the target obstacle in a laser radar coordinate system are determined according to the millimeter-wave data and the point-cloud data for the obstacles in the scene.

With respect to the point-cloud data for the obstacles detected by the laser radar sensor, a ground may be detected based on the point-cloud data for the obstacles in the scene, and interference due to the point-cloud data for the ground may be removed. A velocity of an object may not be determined according to the point-cloud data. However, the target obstacle has a certain area and a distribution rule. Therefore, the point-cloud data of respective target obstacles in the scene may be determined according to the number of the point-clouds and/or the distribution rule of the point-clouds.

At step S230, the relative pose between the millimeter-wave radar sensor and the laser radar sensor is determined according to the first obstacle data and the second obstacle data.

Specifically, determining the relative pose between the millimeter-wave radar sensor and the laser radar sensor according to the first obstacle data and the second obstacle data comprises: determining a position error of the target obstacle according to a relative pose variable between the millimeter-wave radar sensor and the laser radar sensor, and first position data and second position data of the target obstacle, and determining a target function according to the position error of the target obstacle, performing a minimizing process on the target function, and using a relative pose corresponding to a minimized target function as the relative pose between the millimeter-wave radar sensor and the laser radar sensor.

Alternatively, the first obstacle data may be converted to be data in the laser radar coordinate system, which is compared with the second obstacle data for determining the error. Alternatively, the second obstacle data may be converted to be data in the laser radar coordinate system, which is compared with the first obstacle data for determining the error.

Specifically, determining the target function according to the position error of the target obstacle includes: taking a square sum of the position errors of respective target obstacles as the target function, or taking a sum of the absolute values of the position errors of respective target obstacles as the target function. There may be many other methods for determining the target function, which is not limited in this embodiment.

Typically, the relative pose may include six-degree-of-freedom extrinsic parameters for describing a relative rotation angle and a displacement between the two coordinate systems.

With the technical solution in embodiments of the present disclosure, first, at least one target obstacle which is detectable by both the millimeter-wave radar sensor and the laser radar sensor is provided; and then the relative pose between the millimeter-wave radar sensor and the laser radar sensor may be determined according to the first obstacle data for the target obstacle in the millimeter-wave radar coordinate system and the second obstacle data for the target obstacle in the laser radar coordinate system. In this way, the determination of the relative pose between the millimeter-wave radar sensor and the laser radar sensor may be implemented. Based on the determined relative pose, detected information from the sensors may be interconverted between the millimeter-wave radar coordinate system and the laser radar coordinate system, thereby utilizing the detected information more sufficiently.

Embodiment 3

Figure 3:
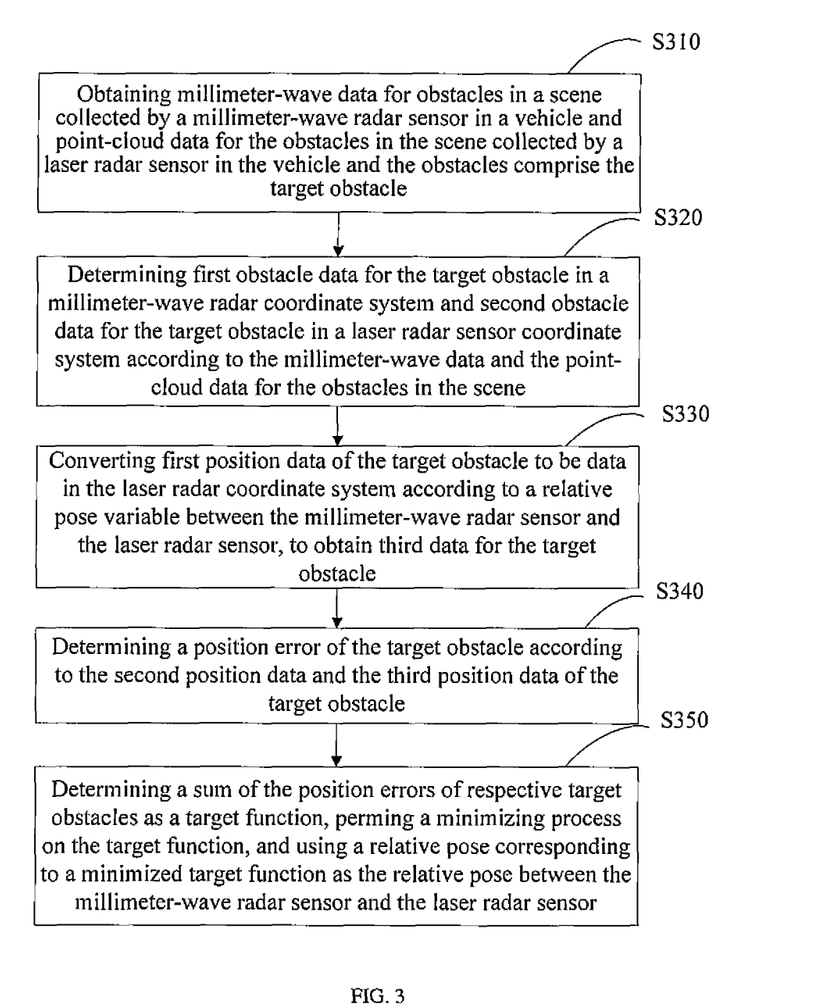
FIG. 3 is a flow chart illustrating a method for determining a relative pose provided in Embodiment 3 of the present disclosure.

FIG. 3 is a flow chart illustrating a method for determining a relative pose provided in Embodiment 3 of the present disclosure. This embodiment is an alternative solution on the basis of the above embodiment by converting the first obstacle data to be data in the laser radar coordinate system to compare with the second obstacle data for determining an error. Referring to FIG. 3, the method for determining a relative pose according to this embodiment comprises the following steps.

At step S310, millimeter-wave data for obstacles in a scene collected by a millimeter-wave radar sensor in a vehicle and point-cloud data for the obstacles in the scene collected by a laser radar sensor in the vehicle are obtained, wherein, at least one millimeter-wave radar signal booster is disposed in the scene as a target obstacle and the obstacles comprise the target obstacle.

At step S320, first obstacle data for the target obstacle in a millimeter-wave radar coordinate system and second obstacle data for the target obstacle in a laser radar sensor coordinate system are determined according to the millimeter-wave data and the point-cloud data for the obstacles in the scene.

At step S330, first position data of the target obstacle is converted to be data in the laser radar coordinate system according to a relative pose variable between the millimeter-wave radar sensor and the laser radar sensor, to obtain third data for the target obstacle.

At step S340, a position error of the target obstacle is determined according to the second position data and the third position data of the target obstacle.

At step S350, a sum of the position errors of respective target obstacles is determined as a target function; a minimizing process is performed on the target function; and a relative pose corresponding to a minimized target function is used as the relative pose between the millimeter-wave radar sensor and the laser radar sensor.

The position error may be an absolute value of the position error.

Specifically, the target function may be minimized iteratively. A relative pose corresponding to an iteratively-minimized target function may be used as the relative pose between the millimeter-wave radar sensor and the laser radar sensor.

With the technical feature in embodiments of the present disclosure, the first obstacle data is converted to be data in the laser radar sensor coordinate system, which is compared with the second obstacle data for determining the error; the sum of the position errors of respective target obstacles is used as the target function to be minimized iteratively; and a relative pose corresponding to the iteratively-minimized target function is used as the relative pose between the millimeter-wave radar sensor and the laser radar sensor and the relative pose. In this way, the relative pose between the millimeter-wave radar sensor and the laser radar sensor may be determined.

Embodiment 4

Figure 4:
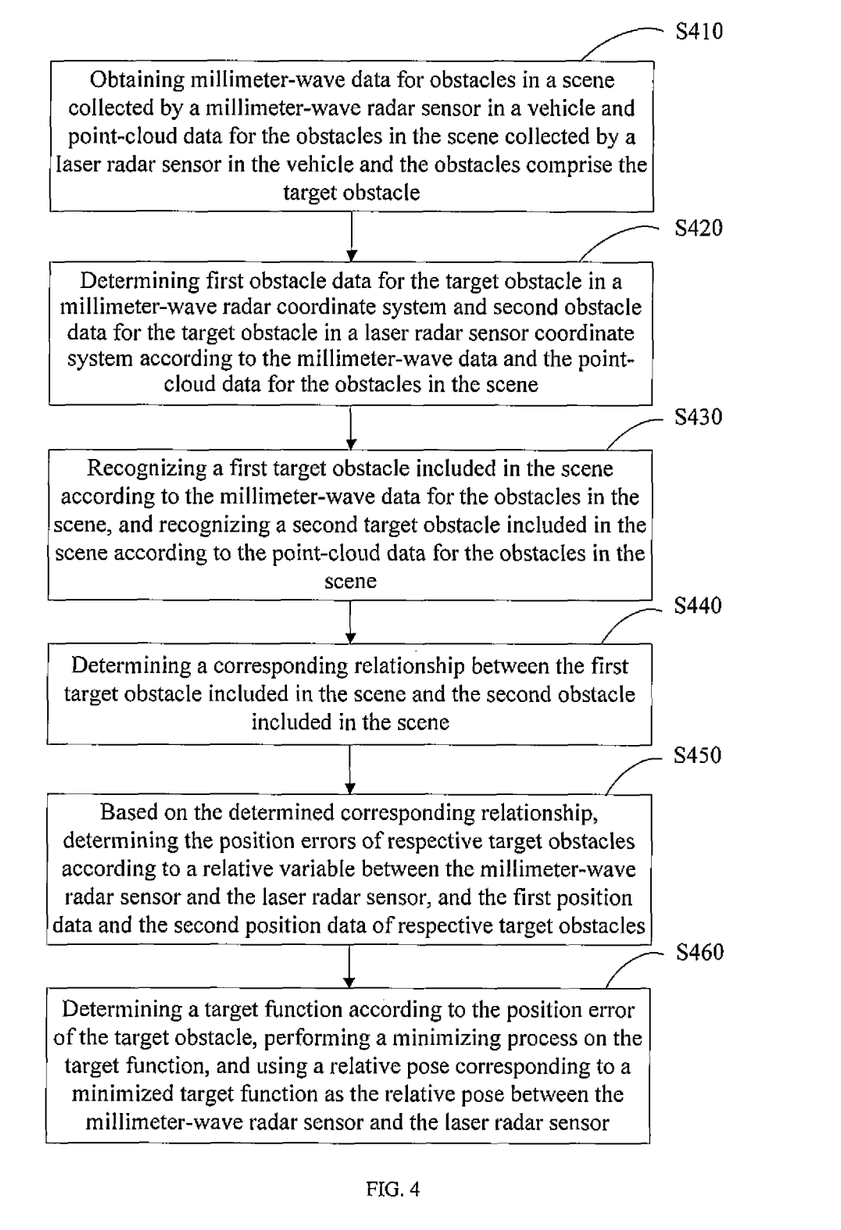
FIG. 4 is a flow chart illustrating a method for determining a relative pose provided in Embodiment 4 of the present disclosure.

FIG. 4 is a flow chart illustrating a method for determining a relative pose provided in Embodiment 4 of the present disclosure. This embodiment is an alternative solution on the basis of the above embodiment. Referring to FIG. 4, the method for determining a relative pose according to this embodiment comprises the following steps.

At step S410, millimeter-wave data for obstacles in a scene collected by a millimeter-wave radar sensor in a vehicle and point-cloud data for the obstacles in the scene collected by a laser radar sensor in the vehicle are obtained, wherein, at least one millimeter-wave radar signal booster is disposed in the scene as a target obstacle and the obstacles comprise the target obstacle.

At step S420, first obstacle data for the target obstacle in a millimeter-wave radar coordinate system and second obstacle data for the target obstacle in a laser radar sensor coordinate system are determined according to the millimeter-wave data and the point-cloud data for the obstacles in the scene.

At step S430, a first target obstacle included in the scene is recognized according to the millimeter-wave data for the obstacles in the scene, and a second target obstacle included in the scene is recognized according to the point-cloud data for the obstacles in the scene.

The second target obstacle may be a target obstacle detected based on the point-cloud data from the laser radar sensor.

Specifically, recognizing the second target obstacle included in the scene according to the point-cloud data for the obstacles in the scene comprises: detecting a ground based on the point-cloud data for the obstacles in the scene, and removing the point-cloud data for the ground; determining the point-cloud data and positions for respective objects in the scene according to a number of the point-clouds and/or a distribution rule of the point-clouds; and recognizing respective second obstacles included in the scene based on the point-cloud data and the positions for the objects in the scene.

It is understood that, the number of the point-clouds and the distribution rule of the point-clouds corresponding to a tree is different from those corresponding to a warning bollard.

The number of the point-clouds and/or the distribution rule of the point-clouds may be obtained according to a point-cloud detection algorithm. Algorithms such as a machine learning algorithm may be used for detecting and recognizing the target obstacle.

At step S440, a corresponding relationship between the first target obstacle included in the scene and the second obstacle included in the scene is determined.

For example, the above corresponding relationship may be understood as follows. Assuming that there are three obstacles 1, 2, and 3 in the obstacle data, and there are three obstacles a, b, and c in the point-cloud data, the corresponding relationship may be determined as 1 and b corresponding to the same actual obstacle, 2 and a corresponding to the same actual obstacle, and 3 and c corresponding to the same actual obstacle.

Specifically, the corresponding relationship may be determined according to a distance between the target obstacles, a distribution rule and/or a number of the point-clouds for the target obstacle.

Typically, when a distance between an obstacle of the first target obstacles and an obstacle of the second target obstacle is within a predetermined distance range, and the distribution rules of the point-cloud data for the two obstacles are same or similar, and the number of the point-clouds for the two obstacles are same or similar, it may be determined that the two obstacles correspond to the same actual obstacle. Therefore, it may be determined that there is a corresponding relationship between the two obstacles.

At step S450, based on the determined corresponding relationship, the position errors of respective target obstacles are determined according to a relative variable between the millimeter-wave radar sensor and the laser radar sensor, and the first position data and the second position data of respective target obstacles.

For example, when 1 and b correspond to the same actual obstacle, a position error of the actual obstacle may be determined according to the second position data of b and the third position data of 1.

At step S460, a target function is determined according to the position error of the target obstacle; a minimizing process is performed on the target function; and a relative pose corresponding to a minimized target function is used as the relative pose between the millimeter-wave radar sensor and the laser radar sensor.

With the technical solution in embodiments of the present disclosure, the corresponding relationship between the target obstacle detected based on the millimeter-wave data from the millimeter-wave radar sensor and the target obstacle detected based on the point-cloud data from the laser radar sensor is determined, for determining the position errors of respective target obstacles according to the corresponding relationship. In this way, when there are a plurality of target obstacles, the position errors of respective target obstacles may be determined, and the relative pose between the millimeter-wave radar senor and the laser radar sensor may be further determined.

It should be noted that, according to the technical guiding of this embodiment, the skilled in the art have the motivation to combine the solutions of any of the embodiments described in the above embodiments, to implement the determination of the relative pose between the millimeter-wave radar sensor and the laser radar sensor.

Embodiment 5

Figure 5:
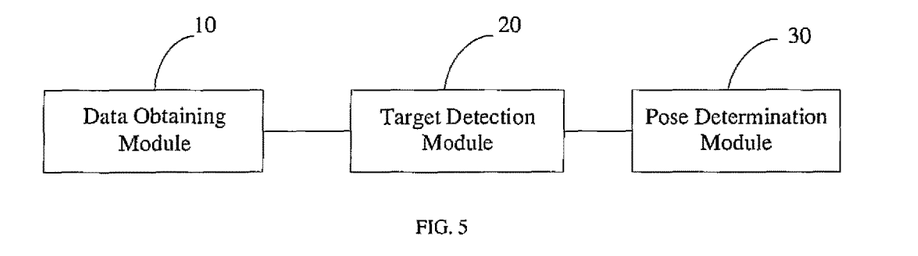
FIG. 5 is a block diagram illustrating an apparatus for determining a relative pose provided in Embodiment 5 of the present disclosure.

FIG. 5 is a block diagram illustrating an apparatus for determining a relative pose provided in Embodiment 5 of the present disclosure. Optionally, the apparatus for determining a relative pose may be installed in autonomous vehicles. Referring to FIG. 5, the apparatus for determining a relative pose according to this embodiment comprises a data obtaining module 10, a target detection module 20, and a pose determination module 30.

The data obtaining module 10 is configured to obtain millimeter-wave data for obstacles in a scene collected by a millimeter-wave radar sensor in a vehicle and first data for the obstacles in the scene collected by a first sensor in the vehicle, wherein, at least one millimeter-wave radar signal booster is disposed in the scene as a target obstacle and the obstacles comprise the target obstacle.

The target detection module 20 is configured to determine first obstacle data for the target obstacle in a millimeter-wave radar coordinate system and second obstacle data for the target obstacle in a first sensor coordinate system according to the millimeter-wave data and the first data for the obstacles in the scene.

The pose determination module 30 is configured to determine the relative pose between the millimeter-wave radar sensor and the first sensor according to the first obstacle data and the second obstacle data.

With the technical solution in this embodiment of the present disclosure, first, at least one target obstacle which is detectable by both the millimeter-wave radar sensor and the first sensor is provided; and then the relative pose between the millimeter-wave radar sensor and the first sensor may be determined according to the first obstacle data for the target obstacle in the millimeter-wave radar coordinate system and the second obstacle data for the target obstacle in the first sensor coordinate system. In this way, the determination of the relative pose between the millimeter-wave radar sensor and the first sensor may be implemented. Based on the determined relative pose, detected information from the sensors may be interconverted between the millimeter-wave radar coordinate system and the first sensor coordinate system, thereby utilizing the detected information more sufficiently.

Further, the pose determination module comprises a coordinate primary conversion unit and a pose determination unit.

The coordinate primary conversion unit is configured to determine a position error of the target obstacle according to a relative pose variable between the millimeter-wave radar sensor and the first sensor, and first position data and second position data of the target obstacle.

The pose determination unit is configured to determine a target function according to the position error of the target obstacle, to perform a minimizing process on the target function, and to use a relative pose corresponding to a minimized target function as the relative pose between the millimeter-wave radar sensor and the first sensor.

Further, the apparatus also comprises a first target recognition module, a second target recognition module, and a data association module.

The first target recognition module is configured to recognize a first target obstacle included in the scene according to the millimeter-wave data for the obstacles in the scene.

The second target recognition module is configured to recognize a second target obstacle included in the scene according to the first data for the obstacles in the scene.

The data association module is configured to determine a corresponding relationship between the first target obstacle included in the scene and the second target obstacle included in the scene.

Further, the first target recognition module comprises a velocity and position filtering unit, a reflection intensity filtering unit, and a first target determination unit.

The velocity and position filtering unit is configured to determine velocities and positions of respective objects in the scene according to the millimeter-wave data for the obstacles in the scene, and to filter out objects of which the velocities are not zero.

The reflection intensity filtering unit is configured to determine reflection intensities of respective objects in the scene according to the millimeter-wave data for the obstacles in the scene, and to filter out objects of which the reflection intensities are lower than an intensity threshold.

The first target determination unit is configured to determine whether the remaining objects are target obstacles according to actual relative distances between different target obstacles and positions of the remaining objects, so as to obtain respective target obstacles included in the obstacle data.

Further, when the first sensor is a laser radar sensor, the second target recognition module comprises: a data filtering unit, an object and position determination unit, and a second target determination unit.

The data filtering unit is configured to detect a ground based on point-cloud data for the obstacles in the scene, and to remove point-cloud data for the ground, the point-cloud data for the obstacles in the scene being the first data.

The object and position determination unit is configured to determine point-cloud data and positions for respective objects in the scene according to a number of the point-clouds and/or a distribution rule of the point-clouds.

The second target determination unit is configured to recognize respective second obstacles included in the scene based on the point-cloud data and the positions for the objects in the scene.

Embodiment 6

Figure 6:
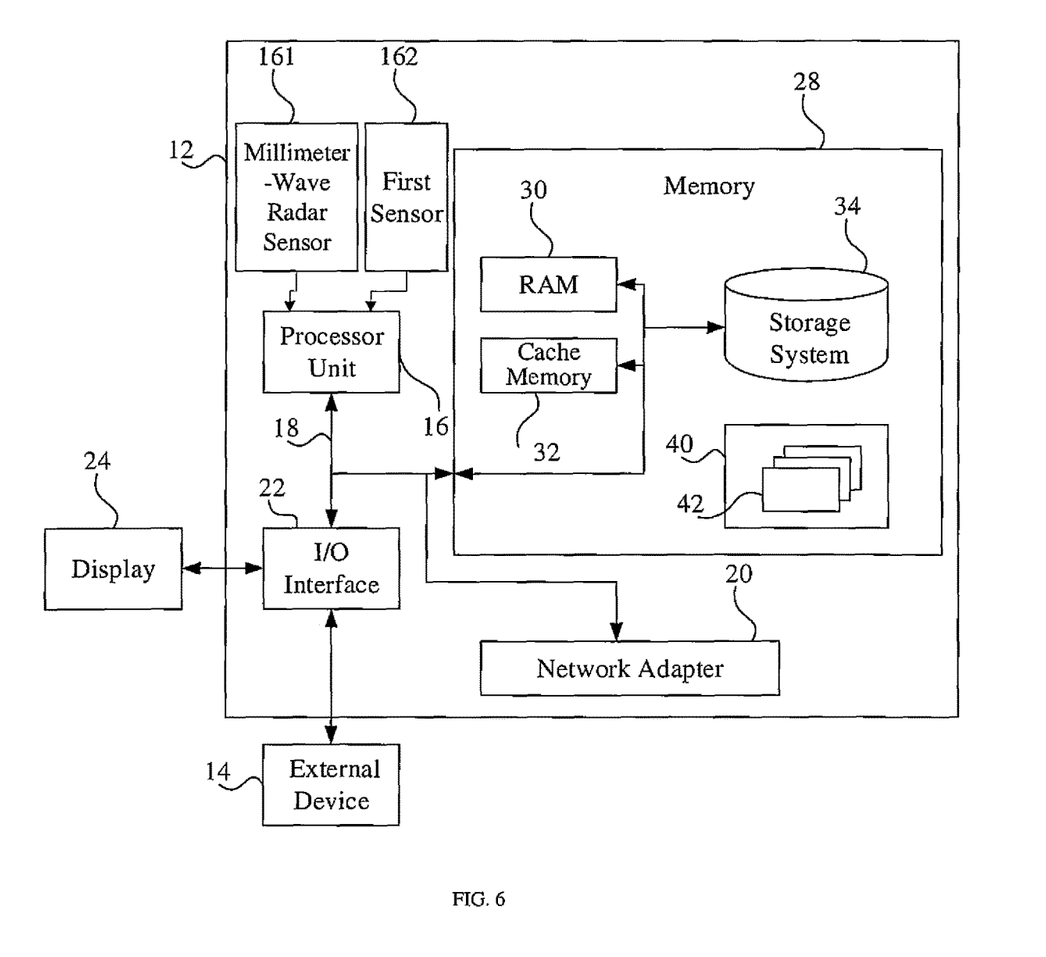
FIG. 6 is a schematic diagram illustrating a device provided in Embodiment 6 of the present disclosure.

FIG. 6 is a schematic diagram illustrating a device provided in Embodiment 6 of the present disclosure. FIG. 6 illustrates a block diagram of an exemplary device 12 applicable to implement embodiments of the present disclosure. The device 12 illustrated in FIG. 6 is only an example, which may not bring any limitation to functions and scope of embodiments of the present disclosure. Typically, the device may be a vehicle equipment installed in autonomous vehicles.

As illustrated in FIG. 6, the device 12 is embodied in the form of a general-purpose computing device. Components of the device 12 may include but not limited to: one or more processors or processing units 16, a system memory 28, and a bus 18 connecting different system components (including the system memory 28 and the processing unit 16). The processing unit 16 also includes a millimeter-wave radar sensor 161 configured to collect millimeter-wave data for obstacles in a scene, and a first sensor 161 configured to collect first data for the obstacles in the scene.

The bus 18 represents one or more of several bus structures, including a storage bus or a storage controller, a peripheral bus, an accelerated graphics port and a processor or a local bus with any bus structure in the plurality of bus structures. For example, these architectures include but not limited to an industry standard architecture (ISA) bus, a micro channel architecture (MAC) bus, an enhanced ISA bus, a video electronics standards association (VESA) local bus and a peripheral component interconnection (PCI) bus.

The device 12 typically includes a plurality of computer system readable mediums. These mediums may be any usable medium that may be accessed by the device 12, including volatile and non-volatile mediums, removable and non-removable mediums.

The system memory 28 may include computer system readable mediums in the form of volatile medium, such as a random access memory (RAM) 30 and/or a cache memory 32. The device 12 may further include other removable/non-removable, volatile/non-volatile computer system storage mediums. Only as an example, the storage system 34 may be configured to read from and write to non-removable, non-volatile magnetic mediums (not illustrated in FIG. 6, and usually called "a hard disk driver"). Although not illustrated in FIG. 6, a magnetic disk driver configured to read from and write to the removable non-volatile magnetic disc (such as "a diskette"), and an optical disc driver configured to read from and write to a removable non-volatile optical disc (such as a CD-ROM, a DVD-ROM or other optical mediums) may be provided. Under these circumstances, each driver may be connected with the bus 18 by one or more data medium interfaces. The system memory 28 may include at least one program product. The program product has a set of program modules (for example, at least one program module), and these program modules are configured to execute functions of respective embodiments of the present disclosure.

A program/utility tool 40, having a set (at least one) of program modules 42, may be stored in the system memory 28. Such program modules 42 include but not limited to an operating system, one or more application programs, other program modules, and program data. Each or any combination of these examples may include an implementation of a networking environment. The program module 42 usually executes functions and/or methods described in embodiments of the present disclosure.

The device 12 may communicate with one or more external devices 14 (such as a keyboard, a pointing device, and a display 24), may also communicate with one or more devices enabling a user to interact with the device 12, and/or may communicate with any device (such as a network card, and a modem) enabling the device 12 to communicate with one or more other computing devices. Such communication may occur via an Input/Output (110) interface 22. Moreover, the device 12 may also communicate with one or more networks (such as local area network (LAN), wide area network (WAN) and/or public network, such as Internet) via a network adapter 20. As illustrated in FIG. 6, the network adapter 20 communicates with other modules of the device 12 via the bus 18. It should be understood that, although not illustrated in FIG. 6, other hardware and/or software modules may be used in combination with the device 12, including but not limited to: microcode, device drivers, redundant processing units, external disk drive arrays, RAID (redundant array of independent disks) systems, tape drives, and data backup storage systems, etc.

The processor 16, by operating programs stored in the system memory 28, executes various function applications and data processing, for example implements a method for determining a relative pose provided in embodiments of the present disclosure.

Embodiment 7

Embodiment 7 of the present disclosure provides a computer readable storage medium having a computer program stored thereon. The computer program implements a method for determining a relative pose according to any of embodiments of the present disclosure when executed by a processor. The method comprises: obtaining millimeter-wave data for obstacles in a scene collected by a millimeter-wave radar sensor in a vehicle and first data for the obstacles in the scene collected by a first sensor in the vehicle, wherein, at least one millimeter-wave radar signal booster is disposed in the scene as a target obstacle; determining first obstacle data for the target obstacle in a millimeter-wave radar coordinate system and second obstacle data for the target obstacle in a first sensor coordinate system according to the millimeter-wave data and the first data for the obstacles in the scene; and determining the relative pose between the millimeter-wave radar sensor and the first sensor according to the first obstacle data and the second obstacle data.

The computer storage medium in embodiments of the present disclosure may employ any combination of one or more computer readable mediums. The computer readable medium may be a computer readable signal medium or a computer readable storage medium. The computer readable storage medium may be, for example, but not limited to an electronic, magnetic, optical, electromagnetic, infrared, or semiconductor system, apparatus or device, or any suitable combination of the foregoing. More specific examples (a non-exhaustive list) of the computer readable storage medium may include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical memory device, a magnetic memory device, or any appropriate combination of the foregoing. In this document, the computer readable storage medium can be any tangible medium that contains or stores a program. The program can be used by or in conjunction with an instruction execution system, apparatus or device.

The computer readable signal medium may include a data signal transmitted in the baseband or as part of a carrier, in which computer readable program codes are carried. The transmitted data signal may employ a plurality of forms, including but not limited to an electromagnetic signal, a light signal or any suitable combination thereof. The computer readable signal medium may also be any computer readable medium other than the computer readable storage medium. The computer readable medium may send, propagate or transmit programs configured to be used by or in combination with an instruction execution system, apparatus or device.

The program codes included in the computer readable medium may be transmitted by any appropriate medium, including but not limited to wireless, electric wire, optical cable, RF (Radio Frequency), or any suitable combination of the foregoing.

The computer program codes for executing operations of the present disclosure may be programmed using one or more programming languages or the combination thereof. The programming languages include object-oriented programming languages, such as Java, Smalltalk, C++, and also include conventional procedural programming languages, such as the C programming language or similar programming languages. The program codes may be executed entirely on a user computer, partly on the user computer, as a stand-alone software package, partly on the user computer and partly on a remote computer, or entirely on the remote computer or server. In the scenario involving the remote computer, the remote computer may be connected to the user computer through any type of network, including a local area network (LAN) or a wide area network (WAN), or may be connected to an external computer (for example, through the Internet using an Internet service provider).

The above is only an optimal embodiment of the present disclosure and technical principle applied thereto. It should be understood by the skilled in the art that, the present disclosure is not limited to the specific embodiment described herein. The skilled in the art may make various obvious changes, modifications and alternatives without departing from the scope of the present disclosure. Therefore, although a detailed illumination is made to the present disclosure by the above embodiments, the present disclosure is not merely limited to the above embodiments. More other equivalent embodiments may also be included without departing from the technical idea of the present disclosure. The scope of the present disclosure is determined by the appended claims.

What is claimed is:

1. A method for determining a relative pose, comprising:
obtaining millimeter-wave data for obstacles in a scene collected by a millimeter-wave radar sensor in a vehicle and first data for the obstacles in the scene collected by a first sensor in the vehicle, wherein, millimeter-wave radar signal boosters are disposed in the scene as target obstacles and the obstacles comprise the target obstacles;
determining first obstacle data for each target obstacle in a millimeter-wave radar coordinate system and second obstacle data for each target obstacle in a first sensor coordinate system according to the millimeter-wave data and the first data for the obstacles in the scene; and
determining the relative pose between the millimeter-wave radar sensor and the first sensor according to the first obstacle data and the second obstacle data;
wherein determining the relative pose between the millimeter-wave radar sensor and the first sensor according to the first obstacle data and the second obstacle data, comprises:
determining a position error of each target obstacle according to a relative pose variable between the millimeter-wave radar sensor and the first sensor, and first position data and second position data of each target obstacle; and
determining a target function according to the position error of each target obstacle, performing a minimizing process on the target function, and using a relative pose corresponding to a minimized target function as the relative pose between the millimeter-wave radar sensor and the first sensor.

2. The method of claim 1, before determining the position error of each target obstacle according to the relative pose variable between the millimeter-wave radar sensor and the first sensor, and the first position data and the second position data of each target obstacle, further comprising:
recognizing a first target obstacle included in the scene according to the millimeter-wave data for the obstacles in the scene;
recognizing a second target obstacle included in the scene according to the first data for the obstacles in the scene; and
determining a corresponding relationship between the first target obstacle included in the scene and the second target obstacle included in the scene.

3. The method of claim 2, wherein recognizing the first target obstacle included in the scene according to the millimeter-wave data for the obstacles in the scene, comprises:

determining velocities and positions of respective objects in the scene according to the millimeter-wave data for the obstacles in the scene, and filtering out objects of which the velocities are not zero;

determining reflection intensities of respective objects in the scene according to the millimeter-wave data for the obstacles in the scene, and filtering out objects of which the reflection intensities are lower than an intensity threshold; and determining whether the remaining objects are target obstacles according to actual relative distances between different target obstacles and positions of the remaining objects, so as to obtain respective target obstacles included in the obstacle data.

4. The method of claim 2, wherein, when the first sensor is a laser radar sensor, recognizing the second target obstacle included in the scene according to the first data for the obstacles in the scene, comprises:

detecting a ground based on point-cloud data for the obstacles in the scene, and removing point-cloud data for the ground, the point-cloud data for the obstacles in the scene being the first data;

determining point-cloud data and positions for respective objects in the scene according to a number of the point-clouds and/or a distribution rule of the point-clouds; and recognizing respective second target obstacles included in the scene based on the point-cloud data and the positions for the objects in the scene.

5. An apparatus for determining a relative pose, comprising:

one or more processors;

a millimeter-wave radar sensor, configured to collect millimeter-wave data for obstacles in a scene;

a first sensor, configured to collect first data for the obstacles in the scene; and a storage device, configured to store one or more programs, wherein, when the one or more programs are executed by one or more processors, the one or more processors is caused to implement a method for determining a relative pose, comprising:

obtaining millimeter-wave data for obstacles in a scene collected by a millimeter-wave radar sensor in a vehicle and first data for the obstacles in the scene collected by a first sensor in the vehicle, wherein, millimeter-wave radar signal boosters are disposed in the scene as target obstacles and the obstacles comprise the target obstacles;

determining first obstacle data for each target obstacle in a millimeter-wave radar coordinate system and second obstacle data for each target obstacle in a first sensor coordinate system according to the millimeter-wave data and the first data for the obstacles in the scene; and determining the relative pose between the millimeter-wave radar sensor and the first sensor according to the first obstacle data and the second obstacle data;

wherein, when the one or more processors are configured to determine the relative pose between the millimeter-wave radar sensor and the first sensor according to the first obstacle data and the second obstacle data, the one or more processors are configured:

to determine a position error of each target obstacle according to a relative pose variable between the millimeter-wave radar sensor and the first sensor, and first position data and second position data of each target obstacle; and to determine a target function according to the position error of each target obstacle, to perform a minimizing process on the target function, and to use a relative pose corresponding to a minimized target function as the relative pose between the millimeter-wave radar sensor and the first sensor.

6. The apparatus of claim 5, before the one or more processors determine the position error of each target obstacle according to the relative pose variable between the millimeter-wave radar sensor and the first sensor, and the first position data and the second position data of each target obstacle, the one or more processors are further configured:

to recognize a first target obstacle included in the scene according to the millimeter-wave data for the obstacles in the scene;

to recognize a second target obstacle included in the scene according to the first data for the obstacles in the scene; and to determine a corresponding relationship between the first target obstacle included in the scene and the second target obstacle included in the scene.

7. The apparatus of claim 6, wherein when the one or more processors are configured to recognize the first target obstacle included in the scene according to the millimeter-wave data for the obstacles in the scene, the one or more processors are configured:

to determine velocities and positions of respective objects in the scene according to the millimeter-wave data for the obstacles in the scene, and to filter out objects of which the velocities are not zero;

to determine reflection intensities of respective objects in the scene according to the millimeter-wave data for the obstacles in the scene, and to filter out objects of which the reflection intensities are lower than an intensity threshold; and to determine whether the remaining objects are target obstacles according to actual relative distances between different target obstacles and positions of the remaining objects, so as to obtain respective target obstacles included in the obstacle data.

8. The apparatus of claim 6, wherein, when the first sensor is a laser radar sensor, and the one or more processors are configured to recognize the second target obstacle included in the scene according to the first data for the obstacles in the scene, the one or more processors are configured:

to detect a ground based on point-cloud data for the obstacles in the scene, and to remove point-cloud data for the ground, the point-cloud data for the obstacles in the scene being the first data;

to determine point-cloud data and positions for respective objects in the scene according to a number of the point-clouds and/or a distribution rule of the point-clouds; and to recognize respective second target obstacles included in the scene based on the point-cloud data and the positions for the objects in the scene.

9. A non-transitory computer readable storage medium having a computer program stored thereon, wherein, when the computer program is executed by a processor in a vehicle, the processor is caused to:

obtain millimeter-wave data for obstacles in a scene collected by a millimeter-wave radar sensor in the vehicle and first data for the obstacles in the scene collected by a first sensor in the vehicle, wherein, millimeter-wave radar signal boosters are disposed in the scene as target obstacles and the obstacles comprise the target obstacles;

determine first obstacle data for each target obstacle in a millimeter-wave radar coordinate system and second obstacle data for each target obstacle in a first sensor coordinate system according to the millimeter-wave data and the first data for the obstacles in the scene; and determine the relative pose between the millimeter-wave radar sensor and the first sensor according to the first obstacle data and the second obstacle data;

wherein the processor is further caused to:

determine a position error of each target obstacle according to a relative pose variable between the millimeter-wave radar sensor and the first sensor, and first position data and second position data of each target obstacle; and determine a target function according to the position error of each target obstacle, perform a minimizing process on the target function, and use a relative pose corresponding to a minimized target function as the relative pose between the millimeter-wave radar sensor and the first sensor.

10. The non-transitory computer readable storage medium of claim 9, before determining the position error of each target obstacle according to the relative pose variable between the millimeter-wave radar sensor and the first sensor, and the first position data and the second position data of each target obstacle, the processor is further caused to:

recognize a first target obstacle included in the scene according to the millimeter-wave data for the obstacles in the scene;

recognize a second target obstacle included in the scene according to the first data for the obstacles in the scene; and determine a corresponding relationship between the first target obstacle included in the scene and the second target obstacle included in the scene.

11. The non-transitory computer readable storage medium of claim 10, wherein the processor is further caused to:

determine velocities and positions of respective objects in the scene according to the millimeter-wave data for the obstacles in the scene, and filter out objects of which the velocities are not zero;

determine reflection intensities of respective objects in the scene according to the millimeter-wave data for the obstacles in the scene, and filter out objects of which the reflection intensities are lower than an intensity threshold; and determine whether the remaining objects are target obstacles according to actual relative distances between different target obstacles and positions of the remaining objects, so as to obtain respective target obstacles included in the obstacle data.

12. The non-transitory computer readable storage medium of claim 10, wherein, when the first sensor is a laser radar sensor, the processor is further caused to:

detect a ground based on point-cloud data for the obstacles in the scene, and remove point-cloud data for the ground, the point-cloud data for the obstacles in the scene being the first data;

determine point-cloud data and positions for respective objects in the scene according to a number of the point-clouds and/or a distribution rule of the point-clouds; and recognize respective second target obstacles included in the scene based on the point-cloud data and the positions for the objects in the scene.

* * * * *